(12) United States Patent
Batty et al.

(10) Patent No.: US 8,050,500 B1
(45) Date of Patent: Nov. 1, 2011

(54) RECOGNITION METHOD AND SYSTEM

(75) Inventors: Thayne S. Batty, Brooklyn, NY (US);
Steven N. Long, Salt Lake City, UT (US)

(73) Assignee: Senapps, LLC, Salt Lake City, UT (US)

( * ) Notice: Subject to any disclaimer, the term of this patent is extended or adjusted under 35 U.S.C. 154(b) by 1151 days.

(21) Appl. No.: 11/825,471

(22) Filed: Jul. 6, 2007

Related U.S. Application Data

(60) Provisional application No. 60/819,252, filed on Jul. 6, 2006.

(51) Int. Cl.
*G06K 9/00* (2006.01)
(52) U.S. Cl. .......................................... 382/187; 382/181
(58) Field of Classification Search .................. 382/181, 382/187
See application file for complete search history.

(56) References Cited

U.S. PATENT DOCUMENTS

| | | | |
|---|---|---|---|
| 5,636,291 A | 6/1997 | Bellegarda et al. | |
| 5,768,423 A * | 6/1998 | Aref et al. ...................... | 382/228 |
| 6,084,985 A | 7/2000 | Dolfing et al. | |
| 6,285,786 B1 | 9/2001 | Seni et al. | |
| 6,418,239 B1 | 7/2002 | Hullender et al. | |
| 6,956,969 B2 * | 10/2005 | Loudon et al. ................. | 382/185 |
| 7,502,509 B2 * | 3/2009 | Sheets et al. ................... | 382/186 |
| 7,505,041 B2 * | 3/2009 | Stamm et al. ................... | 345/469 |
| 2002/0067852 A1 | 6/2002 | Nathan et al. | |
| 2002/0152069 A1 | 10/2002 | Gao et al. | |
| 2002/0168107 A1 | 11/2002 | Tang et al. | |
| 2003/0190074 A1 | 10/2003 | Loudon et al. | |
| 2004/0234128 A1 | 11/2004 | Thiesson et al. | |
| 2005/0100214 A1 * | 5/2005 | Zhang et al. ................... | 382/179 |
| 2005/0175242 A1 | 8/2005 | Tanaka | |

OTHER PUBLICATIONS

Plamondon, Rejean et al. "On-Line and Off-Line Handwriting Recongition: A Comprehensive Survey." IEEE, Jan. 2000, pp. 63-84, vol. 22, No. 1.
Rabiner, Lawrence R., "A Tutorial on Hidden Markov Models and Selected Applications in Speech Recognition." IEEE, Feb. 1989, pp. 257-286, vol. 77, No. 2.
Shu, Han, "On-Line Handwritting Recognition Using Hidden Markov Models." Submitted to the Dept of Electrical Engineering and Computer Science MIT, Feb. 1997, pp. 1-88.
Matsakis Nicholas, "Recognition of Handwritten Mathematical Expressions." Submitted to the Dept of Electrical Engineering and Comptuer Science MIT, May 1999, pp. 1-59.
Narayanaswamy, Shankar, "Pen and Speech Recognition in the User Interface for Mobile Multimedia Terminals," 1996, 172 pgs. University of California, Berkeley.

* cited by examiner

*Primary Examiner* — Stephen Koziol
(74) *Attorney, Agent, or Firm* — Kirton & McConkie

(57) ABSTRACT

Techniques for recognizing discrete multi-component symbolic input from a user can be applied to, for example, handwriting or speech. The techniques can include providing a database of model input sequences, where each model input sequence corresponds to a symbol to be recognized. Input functions, for example, discrete strokes, are obtained from a user and segmented into a sequence of discrete components. Hypothesis symbol sequences are obtained by comparing the discrete components to a database of symbols to be recognized and updating hypothesis symbol sequences based on the results of the comparison and hypothesis symbol sequence history from input previously acquired in time.

32 Claims, 9 Drawing Sheets

60

| | | Character Scores | | | Nodes | | | | | |
|---|---|---|---|---|---|---|---|---|---|---|
| | | | | | A | | B | | C | |
| Time | Input Stroke | A | B | C | Sequence | Score | Sequence | Score | Sequence | Score |
| 0 | | | | | | 0.0 | | 0.0 | | 0.0 |
| 1 | ( ( | - | - | 0.2 | | 0.0 | | 0.0 | C | 0.2 |
| 2 | A { ) | - | 0.6 | 0.2 | | 0.0 | B | 0.6 | CC | 0.4 |
| 3 | - | 2.9 | 0.5 | 0.0 | A | 2.9 | CB | 0.7 | BC | 0.6 |
| 4 | C C | 0.3 | 0.2 | 1.0 | CA | 0.5 | BB | 0.8 | AC | 3.9 |
| 5 | ( l | 0.1 | 0.4 | 0.2 | BA | 0.7 | AB | 3.3 | ACC | 4.1 |
| 6 | B { } | 0.7 | 1.8 | 0.2 | AA | 3.6 | ACB | 5.7 | ACCC | 4.3 |
| 7 | C C | 0.6 | 0.3 | 0.9 | ACA | 4.5 | ACCB | 4.4 | ACBC | 6.6 |
| 8 | C C | 0.2 | 0.3 | 1.0 | ACCA | 4.3 | ACBB | 6.0 | ACBCC | 7.6 |
| 9 | ( ( | 0.3 | 0.3 | 0.1 | ACBA | 6.0 | ACBCB | 6.9 | ACBCCC | 7.7 |
| 10 | A { ) | 0.5 | 0.6 | 0.2 | ACBCA | 7.1 | ACBCCB | 8.2 | ACBCCCC | 7.9 |
| 11 | - | 1.0 | 0.5 | 0.1 | ACBCCA | 8.6 | ACBCCCB | 8.1 | ACBCCBC | 8.3 |
| 12 | B { ( | 0.3 | 0.0 | 0.2 | ACBCCCA | 8.0 | ACBCCBB | 8.2 | ACBCCAC | 8.8 |
| 13 | } | 0.4 | 1.0 | 0.2 | ACBCCBA | 8.6 | ACBCCAB | 9.6 | ACBCACC | 9.0 |
| 14 | C C | 0.6 | 0.4 | 0.8 | ACBCCAA | 9.2 | ACBCCACB | 9.2 | ACBCCABC | 10.4 |

| Time | Input Stroke | Character Scores ||| Nodes ||||||
|---|---|---|---|---|---|---|---|---|---|---|
| | | A | B | C | \multicolumn{2}{c}{A} | \multicolumn{2}{c}{B} | \multicolumn{2}{c}{C} |
| | | | | | Sequence | Score | Sequence | Score | Sequence | Score |
| 0 | | | | | | 0.0 | | 0.0 | | 0.0 |
| 1 | ( A | - | - | 0.2 | | 0.0 | | 0.0 | C | 0.2 |
| 2 | ) | - | 0.6 | 0.2 | | 0.0 | B | 0.6 | CC | 0.4 |
| 3 | - | 2.9 | 0.5 | 0.0 | A | 2.9 | CB | 0.7 | BC | 0.6 |
| 4 | C | 0.3 | 0.2 | 1.0 | CA | 0.5 | BB | 0.8 | AC | 3.9 |
| 5 | C | 0.1 | 0.4 | 0.2 | BA | 0.7 | AB | 3.3 | ACC | 4.1 |
| 6 | ( B } | 0.7 | 1.8 | 0.2 | AA | 3.6 | ACB | 5.7 | ACCC | 4.3 |
| 7 | C | 0.6 | 0.3 | 0.9 | ACA | 4.5 | ACCB | 4.4 | ACBC | 6.6 |
| 8 | C | 0.2 | 0.3 | 1.0 | ACCA | 4.3 | ACBB | 6.0 | ACBCC | 7.6 |
| 9 | ( | 0.3 | 0.3 | 0.1 | ACBA | 6.0 | ACBCB | 6.9 | ACBCCC | 7.7 |
| 10 | A ) | 0.5 | 0.6 | 0.2 | ACBCA | 7.1 | ACBCCB | 8.2 | ACBCCCC | 7.9 |
| 11 | - | 1.0 | 0.5 | 0.1 | ACBCCA | 8.6 | ACBCCCB | 8.1 | ACBCCBC | 8.3 |
| 12 | ( | 0.3 | 0.0 | 0.2 | ACBCCCA | 8.0 | ACBCCBB | 8.2 | ACBCCAC | 8.8 |
| 13 | B } | 0.4 | 1.0 | 0.2 | ACBCCBA | 8.6 | ACBCCAB | 9.6 | ACBCCACC | 9.0 |
| 14 | C | 0.6 | 0.4 | 0.8 | ACBCCAA | 9.2 | ACBCCACB | 9.2 | ACBCCABC | 10.4 |

*FIG. 6*

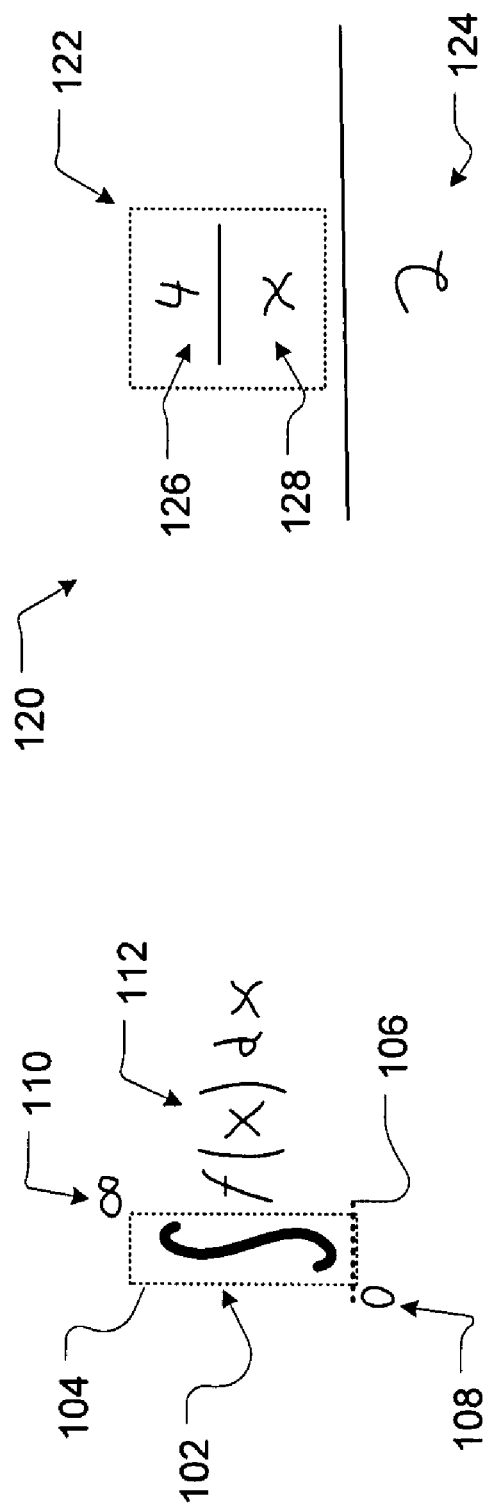

RECOGNITION METHOD AND SYSTEM

RELATED APPLICATIONS

This application claims the benefit of U.S. Provisional Application No. 60/819,252 entitled "Recognition System and Method" filed Jul. 6, 2006, which is incorporated herein by reference in its entirety.

BACKGROUND

The present invention relates generally to automated recognition of user input, such as handwriting recognition. There is a strong desire for automated systems that can recognize user input to improve the quality of human-machine (e.g. human-computer) interfacing. While the computer keyboard and mouse have become ubiquitous, keyboards and mice are inconvenient input devices in many applications. For example, mobile computing devices often are too small to provide a computer keyboard. As another example, some languages are not well suited to computer keyboards.

For example, some systems cannot accept Chinese characters, and users have been forced to use English or contrived systems such as Pinyin in using these systems. In Pinyin, Chinese characters are represented by phoneticized spellings in the Roman alphabet. Pinyin is cumbersome, however, because it requires the user to learn a new alphabet. Moreover, entering Pinyin is tedious if diacritical marks are included, since this requires additional keystrokes to define the diacritical marks. Diacritical marks are necessary to properly represent tonal information which conveys meaning in Chinese. Other systems allow input of Chinese characters by entering a combination of keyboard codes on a conventional QWERTY keyboard. Using these systems is also cumbersome, because it requires memorizing the sequence of keyboard codes for each character. Unlike keyboard entry, handwriting is quite natural. Accordingly, there exists a strong desire for handwriting recognition systems.

Various off-line types of handwriting recognition systems are known, sometimes referred to as optical character recognition. Off-line handwriting systems are limited in their use, however, since they cannot be used for real time applications, such as instant text messaging. Accordingly, off-line techniques fail to address needs such as mobile computing, instant messaging, and real-time computer input.

On-line handwriting recognition systems are known which can perform real-time or near real-time character recognition, but these systems are typically quite complex. For example, some known systems use hidden Markov models to represent each character within an alphabet to be recognized. Such systems typically require large amounts of memory and require significant computer processing power to perform character recognition. Hence, these systems can be slow in performing recognition or can have processing and/or memory requirements incompatible with power-limited portable computing applications.

Existing handwriting recognition systems have also typically been limited to recognizing characters from a single alphabet. Algorithms have sometimes been optimized for a particular alphabet, and thus cannot handle (or perform poorly) when mixed alphabets are used (e.g., combinations of English and Chinese characters).

Even greater challenges are presented by the problem of recognizing mathematical expressions. In mathematical expressions, not only are a large number of different symbols and alphabets used, but also the positional relationship of symbols is important as well. Most existing systems for entering mathematical expressions are tedious, requiring either the entry of special codes to define expressions (e.g. as in TeX) or requiring selection of each symbol from a series of menus (e.g. as in MathType).

SUMMARY

Briefly, and in general terms, the invention is directed to a method of recognizing discrete multi-component symbolic input from a user. The method can include providing a database of model input sequences, each model input sequence corresponding to a symbol to be recognized. Additional steps of the method can include acquiring an input function from a user, the input function including a time function, and segmenting the input function into a sequence of input components. Another step of the method can include determining at least one hypothesis symbol sequence, wherein the hypothesis symbol sequence is updated for each acquired input component. The update can be based on a comparison of the input component to the database and based on a hypothesis symbol sequence history from at least two components previously in time.

In one embodiment, a method of recognizing handwriting input is provided, wherein symbolic characters to be recognized are defined in terms of a sequence of reference stroke components.

In another embodiment, a method of creating a handwriting recognition database is provided which includes acquiring spatiotemporal input from a user, separating the spatiotemporal input into discrete input strokes, and storing normalized representations of the discrete input strokes into a database.

In another embodiment, a method of recognizing handwriting is provided which includes providing a trellis definition corresponding to a plurality of multi-stroke characters to be recognized, acquiring spatiotemporal input from a user, and defining and updating a plurality of node scores for each input stroke, wherein node scores are advanced non-uniformly in time through the trellis.

In another embodiment, a handwriting recognition system is provided which includes a capture system and a processing system. The capture system accepts spatiotemporal input from a user. The processing system separates the spatiotemporal input into discrete input strokes, compares the input strokes to a database of model character stroke sequences, and determines a plurality of candidate character sequences.

In another embodiment, a computer readable medium having computer readable program code embodied thereon for recognizing handwritten characters is provided.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 6 is an illustration of the updating of trellis nodes for the trellis of FIG. 5;

FIG. 10 is an illustration of a mathematical symbol showing special areas of influence in accordance with an embodiment of the present invention; and FIG. 11 is an illustration of a complex fraction showing recursive parsing in accordance with an embodiment of the present invention.

DETAILED DESCRIPTION OF EXAMPLE EMBODIMENT(S)

Figure 2:
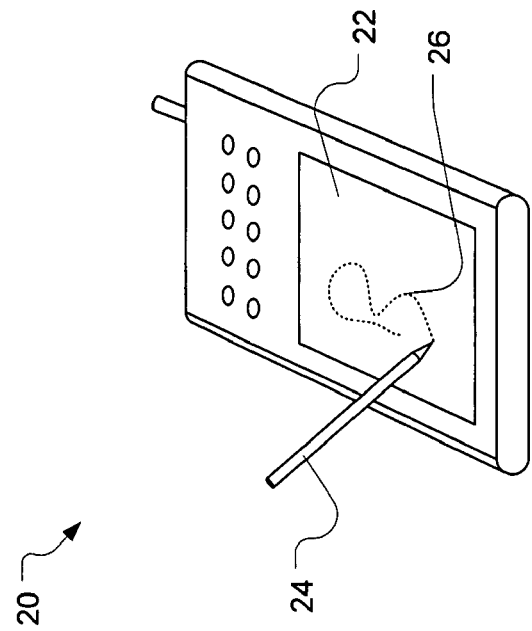
FIG. 2 is an illustration of a portable device which can be used for handwriting input in accordance with an embodiment of the present invention.

Reference will now be made to the exemplary embodiments illustrated, and specific language will be used herein to describe the same. It will nevertheless be understood that no limitation of the scope of the invention is thereby intended.

DEFINITIONS

In describing the present invention, the following terminology will be used.

The singular forms "a," "an," and "the" include plural referents unless the context clearly dictates otherwise. Thus, for example, reference to a stroke includes reference to one or more strokes.

The term "stroke" refers to a spatiotemporal input from a user, for example, defined as the time position of a pen between a pen down event and a pen up event. A stroke may be a dot, line or curve defined by a series of time-tagged coordinates or defined by a mathematical function.

The term "character" refers to a glyph, which may consist of multiple strokes. For example, a character may be an English letter, numeral, Chinese character, mathematical symbol, or the like.

The term "character length" refers to the number of strokes that constitute a character. Character length (and the particular strokes making up a character) may be different for different users.

The term "stroke model" refers to a representation of a stroke within a character. For example, a stroke model may be a normalized spatiotemporal description of the stroke.

The term "character model" refers to a series of stroke models corresponding to a particular character.

The term "character model database" refers to the collection of character models for a set of characters to be recognized.

The term "node" refers to a node within a trellis representation of a set of characters to be recognized.

The term "node score" refers to a score for a particular node. For example, a node score may be a relative likelihood metric.

The term "candidate character sequence" refers to a history of likely characters. A candidate character sequence may be associated with each node.

The term "node hypothesis character" refers to a unique character defined for each head node. For example, the node can correspond to the hypothesis that the most recently input character is the head node hypothesis character.

The term "trellis" refers to a representation of the possible sequences of characters on a stroke by stroke basis. A trellis can be drawn in a graph form, where nodes are connected by lines to indicate possible character sequences.

As used herein, the term "about" means quantities, dimensions, sizes, formulations, parameters, shapes and other characteristics do not need not be exact, but may be approximated and/or larger or smaller, as desired, reflecting acceptable tolerances, conversion factors, rounding off, measurement error and the like and other factors known to those of skill in the art.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to 5" should be interpreted to include not only the explicitly recited values of about 1 to 5, but also include individual values and sub-ranges within the indicated range. Thus, included in this numerical range are individual values such as 2, 3, and 4 and sub-ranges such as 1-3, 2-4, and 3-5, etc. This same principle applies to ranges reciting only one numerical value and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Handwriting Recognition

Figure 1:
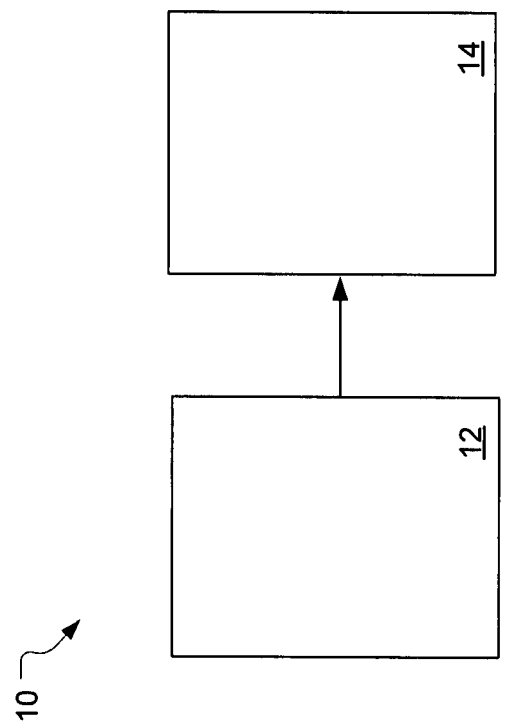
FIG. 1 is a block diagram of a system for handwriting invention in accordance with an embodiment of the present invention.

Illustrated in FIG. 1 is a system for handwriting recognition in accordance with an embodiment of the present invention. The system, shown generally at 10, includes a capture subsystem 12 and a processing subsystem 14. The capture subsystem is configured to accept spatiotemporal input from a user and outputs a digitized representation of the spatiotemporal input. The processing subsystem is coupled to the capture system and determines recognized characters from the digitized representation of the spatiotemporal input. The processing subsystem can include software to implement a character recognition technique as described further below. The processing system can output recognized characters, for example, to a software application or to a display The system can be embedded within a portable electronic device such as a cellular telephone, personal data assistant, or laptop computer, or devices which combine one or more of these functions. For example, as illustrated in FIG. 2, a portable device 20 may include a touch screen 22 for handwriting input. The portable device may be used to provide instant messaging (e.g., via wireless communications networks). The capture subsystem 12 can include the touch screen, which digitizes and outputs a series of time tagged coordinates corresponding to the position of a stylus 24 versus time as the stylus traces a path 26 on the touch pad surface. Recognized characters may be output to a display (e.g. the touch screen) or used for internal applications (e.g. instant messaging).

Figure 3:
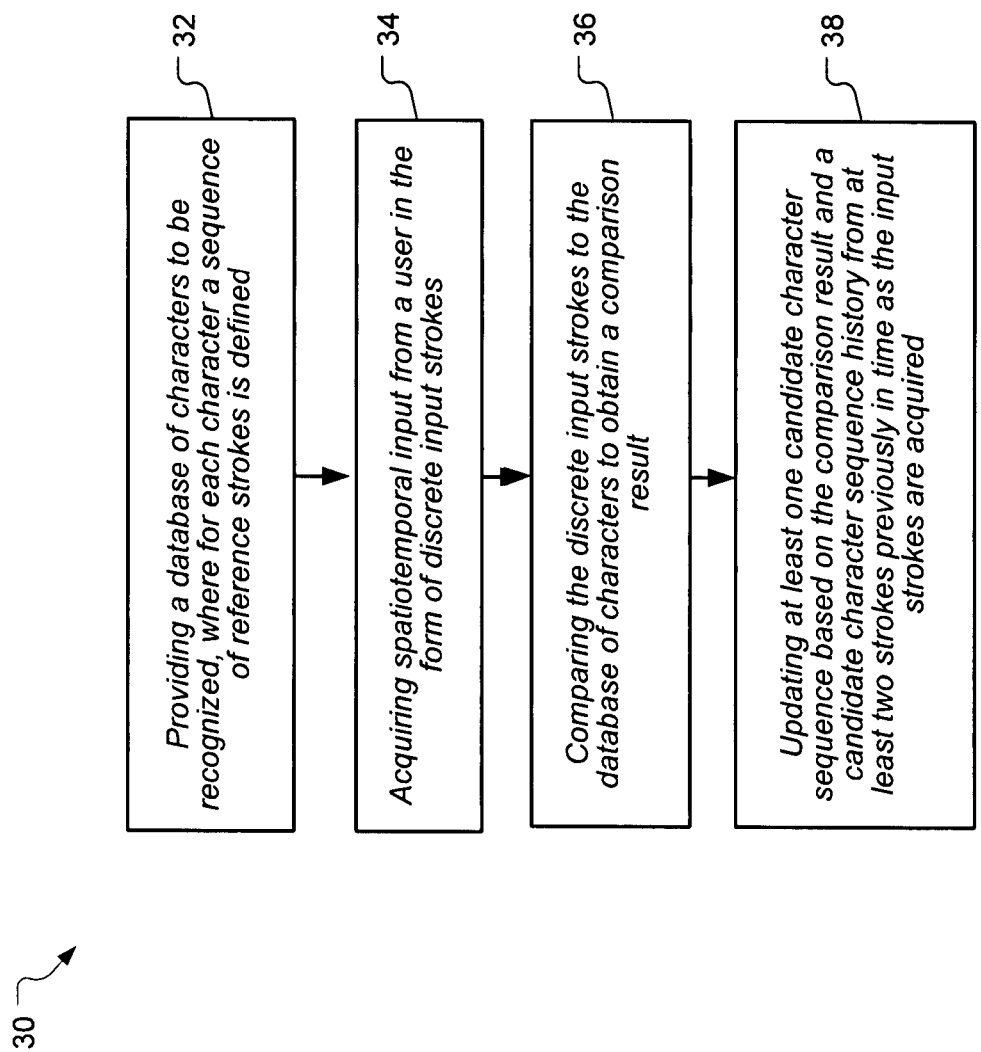
FIG. 3 is a flow chart of a method for recognizing handwritten characters in accordance with an embodiment of the present invention.

A technique for recognizing characters will now be described in further detail. FIG. 3 illustrates a flow chart form a method 30 for recognizing handwritten characters in accordance with an embodiment of the present invention. The method includes providing 32 a database of characters to be recognized. Characters can be defined as a sequence of written reference strokes. The length of each sequence can be different. For example, English letters are typically formed using about one to three strokes, although individual writers may use more or fewer strokes. In contrast, Chinese characters are typically more complex, and can have as many as about 23 strokes. Although the amount of memory used for the database will therefore vary depending on the alphabet to be recognized, efficient use of memory can be obtained by using a variable amount of memory for each character where only the actual strokes required for each character are stored. Additional detail on the database is provided below.

Character recognition begins with the step of acquiring 34 written spatiotemporal input from a user. The spatiotemporal input can be in the form of discrete input strokes. For example, as described above, spatiotemporal input can be provided by a touch pad. The touch pad may separate the spatiotemporal data into discrete input strokes.

The method can include determining a two-dimensional position of the stylus tip as a function of time. For example, the two-dimensional position can be provided as a series of discrete samples of stylus coordinates as a function of time. Discrete input strokes may be delimited by stylus-down and stylus-up events, taking the spatiotemporal input between stylus-down and stylus-up as a single stroke. Hence, the method can include separating the spatiotemporal input into discrete input strokes.

Using discrete strokes as input provides greater flexibility in how handwriting is performed on the input device. For example, characters can be formed on top of each other, since the individual strokes can still be identified and separated. Accordingly, the spatial sequencing of input writing can be relaxed. This can also provide advantages when using mixed language applications where input can vary between being left-to-right and right-to-left.

Use of spatiotemporal input, rather than static bitmap input (e.g., as in off-line character recognition systems) helps to improve performance because the time function aspect of the handwriting input is helpful in distinguishing different characters from each other. For example, a handwritten "4" and "9" may look quite similar, but be formed using different strokes by the user. For example, the "4" may be formed using two strokes, and the "9" formed using a single stroke. Maintaining the time function information can help to distinguish between these characters.

Note that temporal sequencing of strokes need not been consistent when writing letters. For example, considering a three stroke character "A." Stroke 1 from character A is compared to strokes 1, 2, 3 from character B, and each of B1, B2, and B3 are given scores. If the head node is B1 then A2 is compared against B2 and B3, if B2 it is compared against B1 and B3, etc. The path with the best score wins. It remains direction independent in a more brute force manner: when it is comparing A to B it will compare each stroke twice, once forward and once backward, the score of A1 and B1 when traversed forward and B1 when traversed backward. The best score between the forward/backward comparisons is what is actually the head node score. An alternate way of solving this task is realizing that it is an assignment problem (since it involves 1. matching things that belong in two different sets in way that optimizes some quantity 2. the matching is bijective) and using the Munkres' (Hungarian) Algorithm where each entry in the table is found in the same manner as the node score.

While the discussion herein principally addresses the situation where a stroke is defined as extending from a stylus down to a stylus up event, alternate definitions may also be used within embodiments of the present invention. For example, a stroke can be defined as the spatiotemporal input over a time period delimited by some other user action, such as touching a particular portion of the touch screen. As another example, a stroke can be defined as the stylus position observed within a particular area defined on the touch pad, such as a character bounding box. Various other ways to define a stroke will occur to one of ordinary skill in the art having possession of this disclosure which can be used in embodiments of the present invention.

Continuing the discussion of the method 30, a next step is comparing 36 the discrete input strokes to the database of characters to obtain a comparison result. For example, a plurality of character scores can be determined by comparing the discrete input strokes to each character defined in the database. Character scores can be obtained from a distance measure between the input strokes and the sequence of reference strokes. For example, the input stroke and reference strokes can be viewed as curves in space, defined as a function of time. The input stroke and reference stroke can be normalized in one or more spatial dimensions, and also normalized in time. Various distance measures are known in the art for determining a distance between two curves, such as the Frechet, Hausdorff, and Euclidean distances. The distance measure can also include weighting or averaging. For example, differences between the input and reference stroke at the beginning (and end) of the stroke may be weighted more or less heavily than differences at the middle of the stroke. Euclidean distance with elasticity is a specific incarnation of elastic matching. Elastic matching is a dynamic programming method which uses an abstract distance measure, such as Euclidean or another definition of distance. Elastic matching can be desirable because it can, to a certain extent, compensate for minor perturbations in letter shape. Various different predetermined weighting functions may prove useful in embodiments of the present invention, depending on, for example, user preferences and language characteristics. Average Euclidean distance provides an advantage in that it is linear in the number of points on the curve, whereas most other methods are quadratic.

Another step of the method 30 includes selecting and updating 38 candidate character sequences based on the comparison results as the input strokes are acquired. For example, a plurality of candidate character sequences can be maintained, one candidate character sequence corresponding to each possible character to be recognized. As input strokes are received, candidate character sequences are updated to append a hypothesized character. The candidate character sequences scores can be updated based on the character scores and a history of the candidate character sequence score. For example, the character score for the hypothesized character can be added to a candidate character sequence score from previous in time. The position previous in time is based on the number of strokes of the hypothesized character. Since some characters have more than one stroke, at least one of the candidate character sequences is therefore updated based on a candidate character sequence history derived from at least two sequential strokes previously acquired.

It will be appreciated that memory requirements are relatively modest when the number of candidate character sequences that are maintained is equal to the number of possible characters to be recognized. Hence, the memory requirements and complexity of the method grow linearly as the number of characters in the database is increased. This is in contrast to some prior art recognition systems that maintain a large number of state possibilities greatly in excess of the number of input characters than can be recognized.

Figure 4:
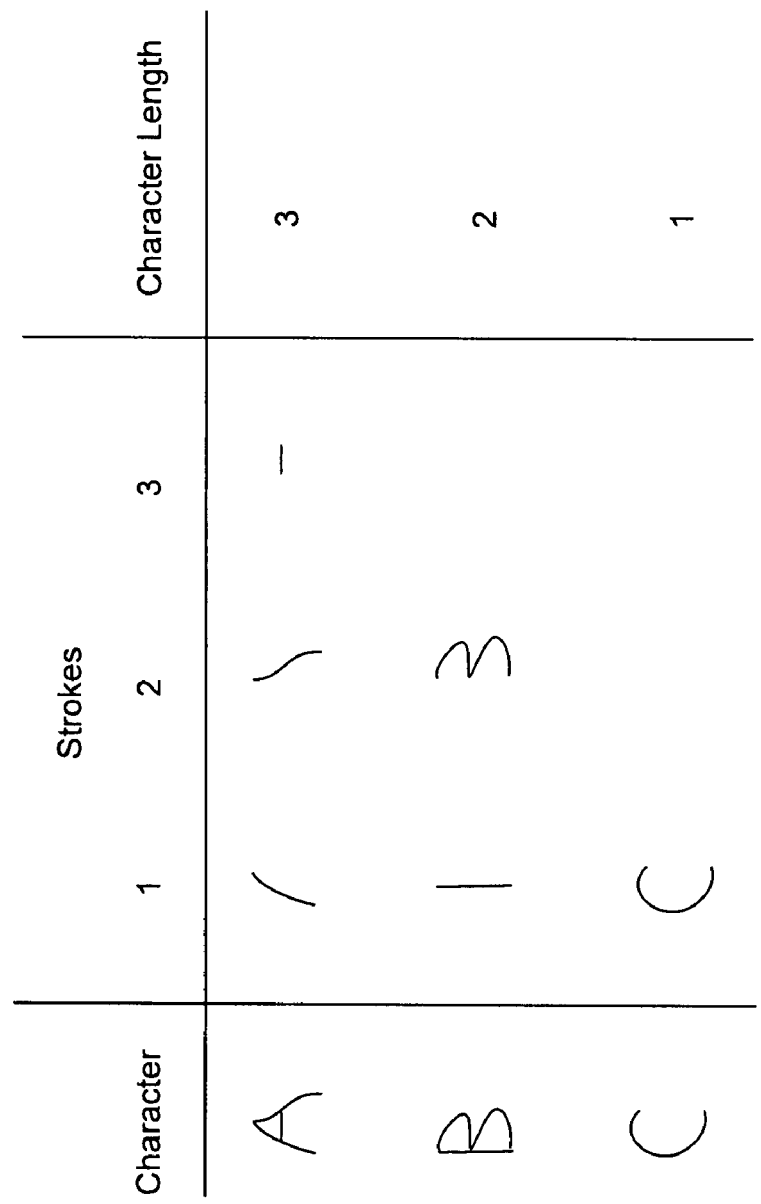
FIG. 4 is an illustration of a database of three characters in accordance with an embodiment of the present invention.
Figure 5:
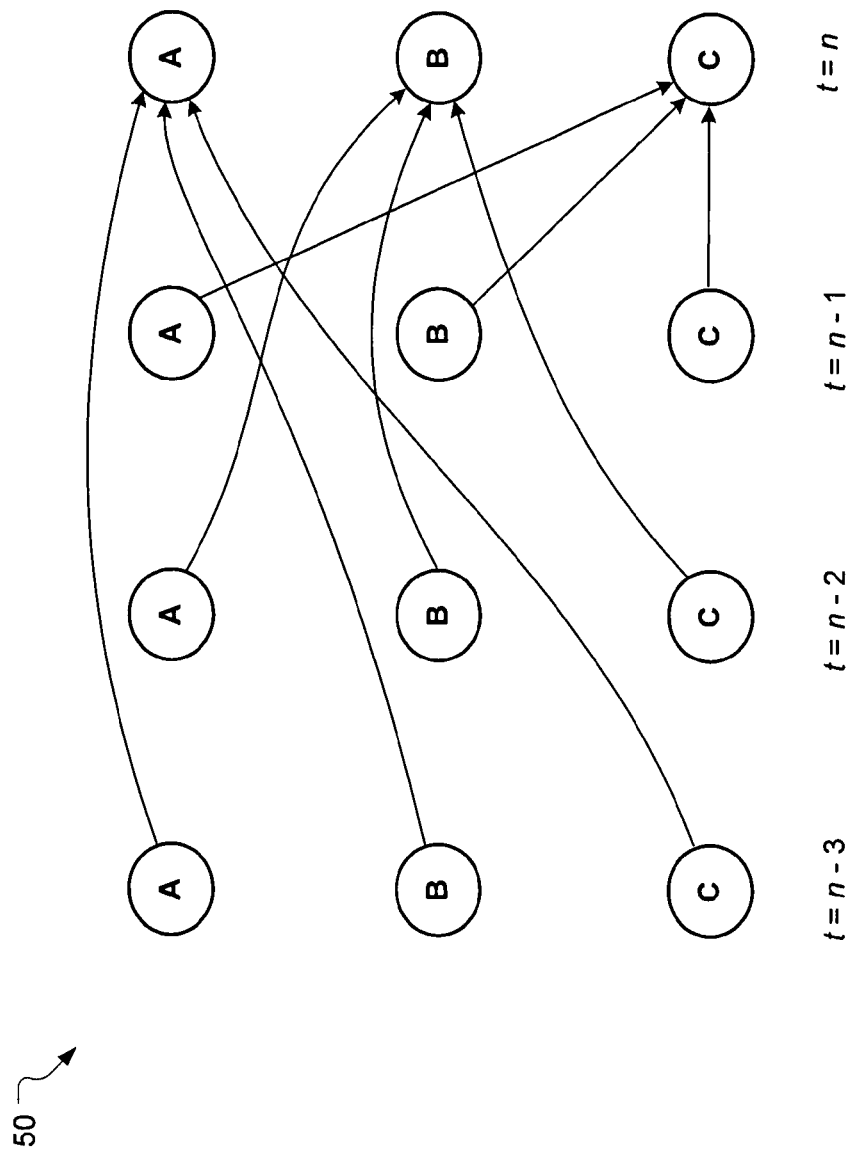
FIG. 5 is an illustration of a trellis definition for the database of FIG. 4.

Updating of the candidate character sequences can be explained further in reference to FIGS. 4 and 5. FIG. 4 illustrates a database of three characters to be recognized, consisting of "A" "B" and "C". The stroke sequence for each character is shown in the table, from which it can be seen that "A" is formed from three strokes, "B" is formed from two strokes, and "C" is formed from a single stroke. Hence, the character length of A is 3, B is 2, and C is 1.

FIG. 5 illustrates a trellis definition 50 for this example. Three nodes are defined (distributed vertically) corresponding to the three characters to be recognized. The trellis definition extends horizontally, each column corresponding to advancing by one stroke. The horizontal axis thus corresponds roughly to time, although not every stroke requires the same amount of time. The trellis definition shows all possible node sequences, where each node corresponds to a hypothesized character as a candidate character sequences is built up. It can be seen that some transition paths skip columns, corresponding to multi-stroke characters.

Recognition thus proceeds as follows. Each node corresponds to a hypothesis that the most recently acquired strokes corresponds to the node's corresponding character. For ease of reference, the character corresponding to each node will be referred to as the node hypothesis character. Thus, the node score can be updated based on how well the last few acquired strokes correspond to the reference strokes of the node hypothesis character. The node score can also take into account the node score for the node that was considered most likely before the current character.

More particularly, at time n, node scores can be updated as follows. Character scores are obtained by comparing the input strokes to the database of reference strokes. For example, a character score for "A" is obtained by comparing the last three input strokes to the three reference strokes in the database for character "A". Node scores are then updated based on the character scores and node scores from previously in time. For example, for node "A" the node score at time n is based on the most likely node score from time n−3 combined with the character score for "A". For node "B" the node score at time n is based on the most likely node score from time n−2 combined with the character score for "B". Finally, for node "C" the node score at time n is based on the most likely node score from time n−1 combined with the character score for "C". For example, the node score from previous in time can be added to the character score to obtain the new node score. Because some of the transitions skip nodes, the node scores are advanced non-uniformly in time through the trellis. Node scores are updated based on node scores from previous in time by a number of strokes corresponding to the node hypothesis character.

Path history through the trellis can also be maintained in the form of candidate character sequences. When the node scores are updated, the candidate character sequences can be updated by appending the node hypothesis character to the candidate character sequence which corresponds to the most likely node from previous in time used in updating the node score.

A more detailed example is provided by FIG. 6 which illustrates the updating 60 of trellis nodes for a hypothetical series of input strokes for the above three character example. Time is shown in the vertical direction, with the first column in FIG. 6 showing the stroke number. The actual input sequence from the user is "ACBCCABC" which is a total of 14 strokes, and time is shown running from t=1 (the end of the first stroke) to t=14 (the end of the $14^{th}$ stroke).

As each input stroke is received, new character scores are computed for all three characters as shown in FIG. 6 by the columns labeled "Character Scores." Following computation of the character scores, node scores (labeled "Score") and candidate character sequences (labeled "Sequence") are then updated as described above as will now be detailed.

For time t=0, the candidate character sequences are initialized to be blank, and the scores are zeroed. At time t=1, corresponding to the first stroke, only a character score for character C can be obtained, since A and B require more than one stroke. For illustration purposes, the character scores are assumed to range between 0 and 1, where 0 is a very poor match, and 1 is a very good match. Other scaling systems can be used in embodiments of the present invention as will occur to one of ordinary skill in the art in possession of this disclosure. The character score for C is 0.2. The character scores shown in this example have been artificially created, and may not correspond to actual character scores which would be obtained during actual operation using the exemplary input.

At time t=1, only the score for node C can be updated, since there have not been enough input strokes received for an "A" or a "B". Hence, the score for node C is updated by setting it equal to the character score for "C". Hence, node C has a score of 0.2 at time t=1. The candidate character sequence for node C has a "C" appended.

At time t=2, character scores for characters B and C can be obtained. The character score for B is obtained by comparing the last two input strokes to the reference strokes for B, and for this example, is equal to 0.6. The character score for C is obtained by comparing the last input stroke to the reference stroke for C, which for this example is 0.2. Note that these character scores indicate that the last input stroke is a relatively poor match to a "C" and that the last two input strokes are a reasonable good match to a "B".

The node score for nodes B and C are updated based on these character scores, and the candidate character sequences updated by appending the node hypothesis character. For node B, at this point in time, the only possibility is that the two input strokes correspond to a single "B" hence node B's score is set to 0.6 (the character score for B) and node B's candidate character sequence has a "B" appended. For node C, at this point in time, the only possibility is that the two input strokes correspond to a "C" followed by a "C." Hence, node C's score is set equal to 0.2+0.2=0.4 (the character score for C, plus node C's score from time t=1).

At time t=3, character scores for all three characters are obtained. Note that the character score for A is quite large, since the input strokes are an excellent match to the reference strokes. The node scores are updated. For node A, since this is the first character, the node score is the character score, 1.9. For node B, the only possible previous character is a C, so the node score is based on the node score for node C from t=1 (equal to 0.2) plus the B character score (equal to 0.5) to yield a score of 0.2+0.5=0.7. For node C, the previous character could be either a B or C at time t=2. The most likely node is used, which in this example is node B. Hence, the C node's score is 0.0 (the C character score)+0.6 (node B's score at t=2)=0.6. Node C's candidate sequence is obtained by appending a C to the candidate sequence from node B at time t=2 to yield BC.

After completion of updates for time t=3, it can be seen that the node score for node A is quite a bit larger than that the score for node B and node C. This is as expected, since the actual input in this example is an "A".

At time t=4, the next input stroke is the single stroke character C. The character score for character C is accordingly relatively large. Updates of node score and candidate character sequences are performed. The update for node C selects node A from t=3 since it was the most likely node at that time, and appends the hypothesis character C to the candidate sequence from node A. Updates for nodes A and B follow the same algorithm as described above. While the resulting candidate character sequences for node A and B do not correspond to the actual input sequence, it can be seen that the node scores are relatively low. It will be seen later in this example that the correct candidate character sequence will eventually be selected for these nodes as more input is received.

At time t=5, the next stroke input is the beginning of a letter B. The character scores are updated, and node scores updated as above. It is interesting to note, that after updating the node scores and candidate character sequences, none of the nodes has the correct character sequence. This is not a problem, however, as future updates may reach back earlier in time to node scores and candidate character sequences which are correct. This is seen in the next update. At time t=6, node B reaches back to time t=4, and selects node C as the most likely. The candidate character sequence for node B thus is set equal to the correct sequence.

Additional input strokes for time t=7 to t=14 are shown in FIG. 6, and the resulting updated node scores and candidate character sequences. These updates will not be discussed in detail as how they are computed will be apparent from the above. It can be seen that node candidate character sequences tend to converge to the correct sequence which corresponds to the actual input sequence.

It will now be appreciated, that as each input stroke is received, candidate sequences and node scores are updated based on candidate sequences and node scores from previously in time. As each node's candidate sequence is updated, some possible sequences are effectively discarded, helping to keep the number of candidate sequences under consideration manageable. In particularly, the number of different nodes in the trellis (and thus the number of candidate character sequences) under consideration can be set equal to the number of possible characters to be recognized. This is in contrast to a conventional brute force search, for which the number of possible sequences under consideration would grow exponentially with time.

It should also be appreciated that the required computational processing is relatively simple, consisting mostly of add-compare-store type operations. Accordingly, a relatively simple processor can be used to implement the method. Alternately, the method can also be implemented in hardware, such as in a field programmable gate array or application specific integrated circuit.

The implementation detail just described is similar to the Viterbi algorithm as known in the art. Unlike a conventional Viterbi algorithm, however, the nodes are not advanced uniformly in time through the trellis. As illustrated above, nodes may reach back many strokes in time when updating the node score and candidate character sequence.

The above discussion with respect to FIGS. 5 and 6 has not made reference to any particular arrangement of the node scores and candidate character sequences in memory. Many different arrangements of these parameters within memory can be used as will occur to one of ordinary skill in the art having possession of this disclosure.

Character Output

Returning to the discussion of the method 30 (FIG. 3), the method can also include the step of outputting a recognized character. For example, recognized character can be output after a predetermined number of strokes, such as the maximum character length. It will be appreciated from the example shown above in FIGS. 4-5, that after a delay equal to the maximum character length, the candidate character sequences will typically have converged and agree on what characters were input. Accordingly, recognized characters can be taken from one of the candidate character sequences and output after a delay. The delay can be equal to the maximum character length, or some other value. As another example, recognized characters can be output after all of the candidate character sequences agree on the recognized character for a given point in time. Various other approaches for deciding when to output characters will occur to one of ordinary skill in the art in possession of this disclosure.

Output of recognized characters can be illustrated with reference to FIG. 6. It can be seen that, at time t=3, the first complete character has been received. After a delay of three more strokes, at time t=6, all three node's candidate character sequences have been updated to the point that they are in agreement that the first character is an "A".

It should be appreciated that the output of characters can be quite rapid. As illustrated by FIG. 6, convergence is quite rapid, and thus recognized characters can be output with relatively little delay. This provides advantages in real time applications, both in responsiveness of the system to the user, as well as allowing the user to quickly correct errors in the recognition process.

The character can be output in various encoding formats known the art. For example, characters can be output in 7-bit or 8-bit ASCII as is known in the art. As another example, characters can be output in UNICODE as is known in the art. UNICODE presents advantages in that a large number of alphabets and characters have are defined, although UNICODE encodings require more bits than ASCII. Various other encoding formats can also be used as is known in the art.

The method 30 can be implemented by computer software implemented on a general purpose or specialized processor. Accordingly, in an embodiment, the invention includes a computer readable medium having computer readable program code embodied thereon for implementing the method. For example, the computer readable medium can include code for providing a database of characters to be recognized as discussed further below. The computer readable medium can also include program code for acquiring spatiotemporal input from a user interface and outputting discrete input strokes as described above. The computer readable medium can also include code for comparing the discrete input strokes to the database to obtain a plurality of character scores as described above. The computer readable medium can also include code for determining a plurality of candidate character sequences as described above. The computer readable medium can also include computer program code for outputting a recognized character. For example, recognized characters may be output to a display, other hardware device, or to other software for further processing.

Various types of computer readable medium are known in the art which can be used. For example, the computer readable medium can be a floppy disk, compact disk (CD-ROM), digital video disk (DVD), flash memory (e.g., a flash drive or USB drive), read only memory, or a propagated signal (e.g. Internet communications using the internet protocol), or the like. New types of computer readable medium may also be developed in the future and may also be used to distribute computer software implementing the method.

Database Generation

The database of characters to be recognized will now be discussed in further detail. In an embodiment of the invention, providing a database of characters may be performed by distributing a predefined database of characters to be recognized. For example, the database may be stored on a computer readable medium such as a floppy disk, compact disk, digital video disk, read only memory, flash memory, or the like. In another embodiment, providing a database of characters may be performed by a user as will now be described.

Figure 7:
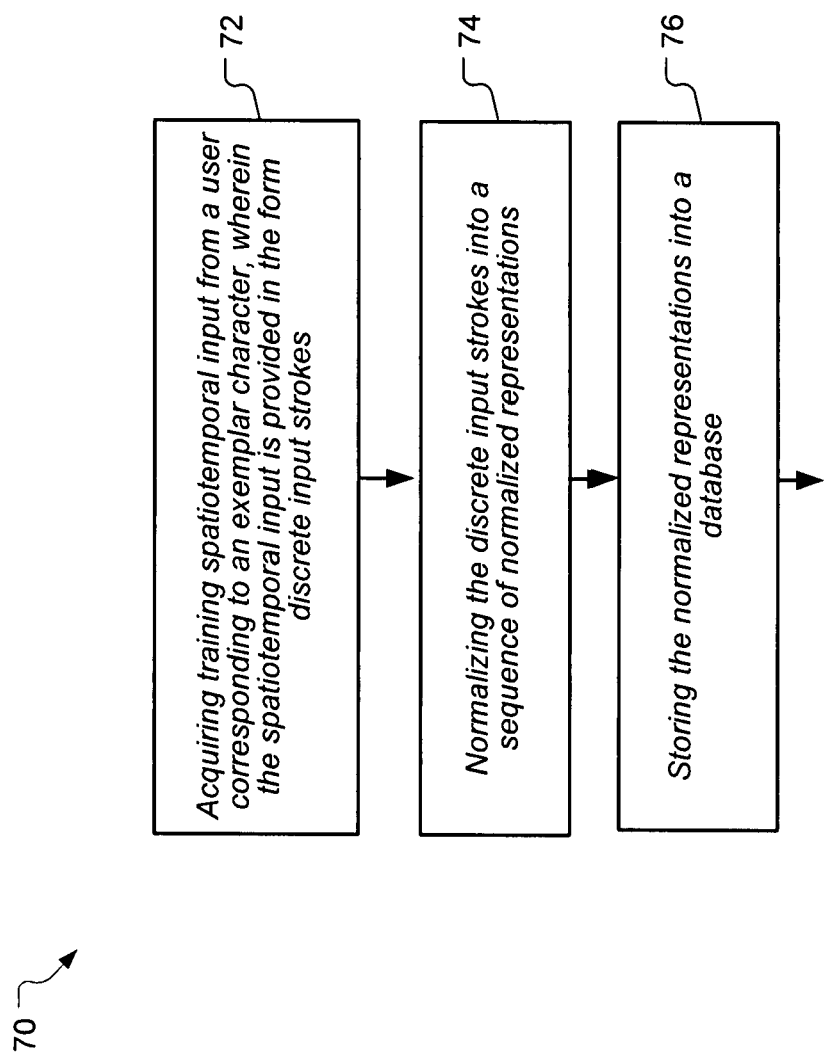
FIG. 7 is a flow chart of a method of creating a handwriting recognition database in accordance with an embodiment of the present invention.

A method of creating a handwriting recognition database is illustrated in flow chart form in FIG. 7, in accordance with an embodiment of the present invention. The method 70 includes acquiring 72 spatiotemporal training input from a user corresponding to an exemplar character, wherein the spatiotemporal training input is provided in the form of discrete input strokes. For example, a user may be prompted to input a keyboard key, ASCII code, UNICODE code, or similar computer-readable designation of a character, and then provide handwriting input on a touch screen or pad corresponding to the character. The spatiotemporal input may be provided by a capture subsystem as discrete input strokes, or the spatiotemporal input may be separated into discrete input strokes using processing as described above.

A next step of the method is normalizing 74 the discrete input strokes into a sequence of normalized representations. Creating normalized representations is helpful in reducing the complexity of performing comparisons of input strokes to the database. In an embodiment, normalized representations can be performed by determining a non-uniform rational b-spline for each of the discrete input strokes. The non-uniform rational b-spline can be scaled to fit between 0 and 1 in all parameters (e.g. time) and coordinates (e.g. x-y values).

The method also includes storing 76 the normalized representations into the database. As discussed above, variable amounts of memory may be used for each character to be recognized to improve memory efficiency.

Using the method 70, a user can create a customized handwriting recognition database tuned to their particular way of writing characters. The handwriting recognition database need not be limited to a single alphabet. For example, a user can define the database to include characters from mixed and multiple alphabets, such as English characters, Latin characters, Greek characters, Cyrillic characters, Chinese characters, Braille characters, mathematical symbols, and variants and combinations of the above. In general, virtually any alphabet which can be represented as combinations of discrete strokes can be included in the database. This can greatly enhance the functionality and utility of devices using the handwriting recognition techniques disclosed herein.

A user can also create multiple models for an individual character, for example, where a user sometimes generates a character using 1 stroke and sometimes generates a character using 2 strokes. Thus, more than one normalized representation for a given character may be included in the database. Recognition processing can treat the two representations as though they are different characters (although the same output is ultimately produced), or the recognition processing can be simplified to take into account the two different representations.

Figure 8:
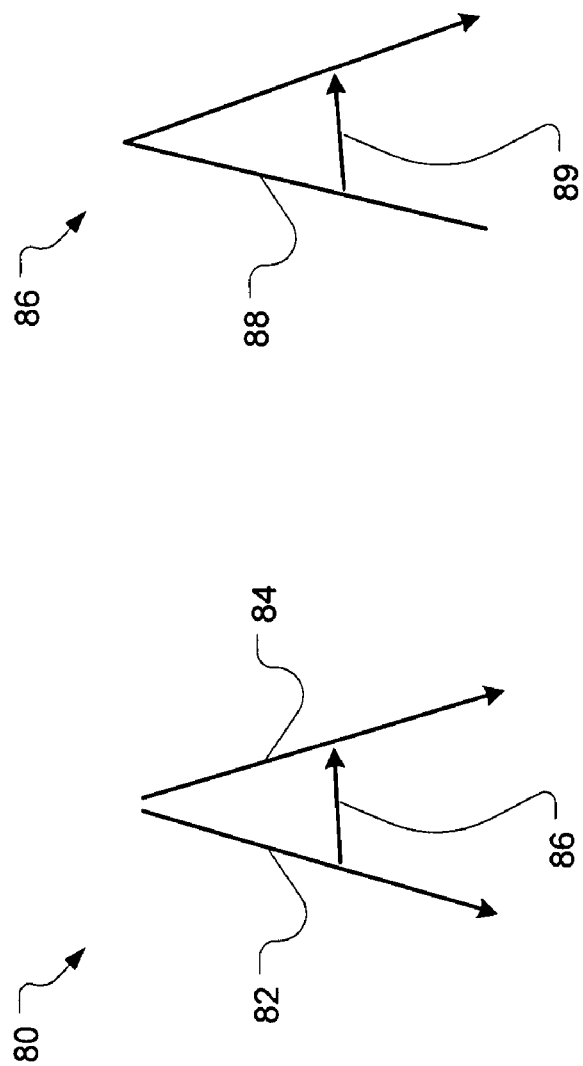
FIG. 8 is an illustration of two different ways of forming a letter.

For example, suppose a user has two different stroke sequences for making an "A" as illustrated in FIG. 8. A first sequence 80 consists of three strokes 82, 83, 84, and a second sequence 86 consists of two strokes 88, 89. In one embodiment, the two different stroke sequences can be treated like different characters, and a database entry provided for each.

A more efficient approach, however, is to combine the two different possible ways of making an A into a single node. Thus, when the node corresponding to A is updated, a comparison between two hypotheses is performed. One hypothesis is based on the comparison of the last three input strokes to the first sequence 80 in the database combined with the most likely node from three strokes previously in time (since the length of the first sequence is three strokes). The other hypothesis is based on the comparison of the last two input strokes to the second sequence 86 in the database combined with the most likely node from two strokes previously in time. The more likely of the two hypotheses is then used, and the node score and candidate character sequence updated accordingly. Using this approach, the number of nodes in the trellis does not need to be increased even when multiple different stroke sequences for each character are defined in the database.

Mathematical Expressions

Figure 9:
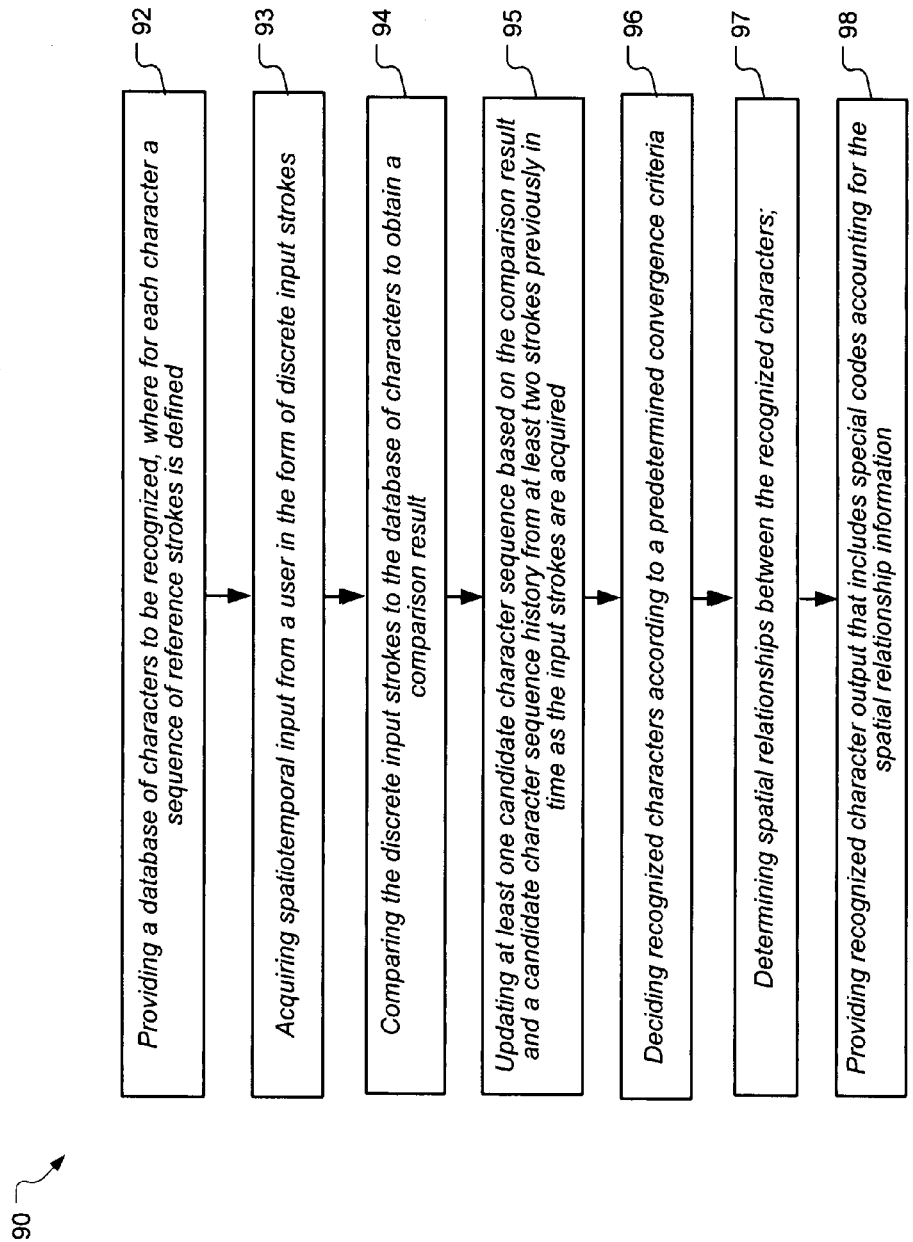
FIG. 9 is a flow chart of a method of performing handwriting recognition in accordance with an embodiment of the present invention.

Additional processing may be performed when performing recognition of mathematical expressions. Mathematical expressions often include superscripts, subscripts, and other positional relationships between characters which carry important information. FIG. 9 illustrates a flow chart of a method of performing handwriting recognition in accordance with an embodiment of the present invention. The first four steps 92, 93, 94, 95 of the method are the same as described for handwriting recognition, and are described above with reference to FIG. 3. The fifth step 96 of the method includes deciding recognized characters according to a predetermined convergence criteria. For example, as described above, the predetermined convergence criteria can include waiting a predetermined number of strokes, or waiting until all of the candidate character sequences agree on a character at a given point in time.

The next step 97 of the method includes determining spatial relationships between the recognized characters. For example, spatial relationships can be determined based on the relationships of bounding boxes which circumscribe the characters, based on baseline heights of the characters, or based on special areas of influence defined for particular characters, or combinations of all three. For example, certain characters have predefined spatial positions that relate to the character which can be accounted for. FIG. 10 illustrates an example of an integral sign 102, showing a bounding box 104 and baseline 106 for the integral sign. Symbols are included at various positions relative to the integral sign as known in the art, which represent integration limits 108, 110 and the integrand 112. Accordingly, the character recognition database can include information defining these relative positions, and character recognition take into account the positioning of subsequently drawn characters relative to the integral as defining the integration limits and integrand. Of course, the order of drawing characters can be defined differently than just described.

The spatial parsing can also correct errors which occur during recognition. For example, since size is irrelevant when scaling of the character models is performed, symbols such as periods, dots, and commas can be misrecognized. The spatial parsing can thus correct these types of errors by taking into account both position and the size of the bounding box.

Various orders for performing the spatial parsing can be used. For example, fractions can be parsed before plus or minus signs. Bounding boxes can be defined as the smallest possible rectangle that still covers all points making up a glyph. For each glyph, the areas of influence can be defined separately.

As another example, FIG. 11 illustrates a complex fraction 120, which can be parsed recursively as an outer fraction with numerator 122 and denominator 124, and an inner fraction with numerator 126 and denominator 128.

Once a mathematical expression has been recognized, the expression can be output in various formats. For example, character output can be provided as a series of ASCII codes, MathType codes, LaTex codes, or the like.

Alternate Applications

While the foregoing discussion has focused principally on handwriting recognition, embodiments of the present invention can be used for other types of machine recognition of discrete multi-component symbolic input. By multi-component input is meant user input of a type which can be segmented into separate components (e.g. strokes in handwriting, phonemes in speech, gestures in image recognition, etc.). By symbolic is mean that the user input is represented by a machine usable symbol (e.g. a character, word, command, etc.). For example, as described above, handwriting strokes represent a letter which can be encoded as a symbol within a computer system in ASCII or the like. Similarly, embodiments of the present invention may be applied to speech processing, where speech waveforms are captured and broken into individual phonemes for recognition processing.

As described above, recognition uses a database of model input corresponding to the reference symbols to be recognized. For example, written characters can be modeled by a sequence of strokes. Spoken words can be modeled as a sequence of phonemes. The database can be preprogrammed, or generated by a user by providing exemplary input. The model input can be a function of time, such as a spatiotemporal input, a voltage waveform, or the like.

Recognition can be performed in real time, acquiring an input function from a user, and then determining hypothesis symbols sequences. Acquiring the input function may include segmenting the input function into a sequence of input components, such as strokes, phonemes, gestures, and the like. As discussed above, since the model input for a symbol may have multiple input components, updating of hypothesis symbol sequences can be based on hypothesis symbol sequences from previously in time. The updates may look back in time by a number of components equal to the length of the model input sequence for the hypothesis symbol. This may be, for example, two or more components previously in time.

CONCLUSION

Summarizing, and reiterating to some extent, a technique for machine recognizing discrete multi-component symbolic input from a user has been invented. While described primarily for handwriting recognition, the technique can also be applied to other types of user input, including for example speech. Input from a user which includes a time function is broken into discrete components. By maintaining the time varying aspects, improved recognition can be obtained as compared to static bitmap type recognition. Processing and memory requirements are modest, growing only linearly with the number of symbols to be recognized. The recognition algorithm uses mostly simple add-compare-store type operations. Hence, the recognition technique is compatible with power and processing limited mobile computing applications.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

What is claimed is:

1. A method (30) of recognizing handwriting input, comprising the steps of:
   a) providing (32) a database of characters to be recognized, wherein characters are defined by a sequence of written reference strokes;
   b) acquiring (34) written spatiotemporal input from a user in the form of discrete input strokes;
   c) comparing (36) the discrete input strokes to the database of characters to obtain a comparison result; and
   d) selecting and updating (38) a plurality of candidate character sequences based on (i) the comparison result and (ii) a candidate character sequence history derived from at least two sequential strokes previously acquired in step b, wherein the candidate character sequence history comprises a plurality of candidate characters.

2. The method of claim 1 wherein the step of comparing the input strokes includes determining a plurality of character scores.

3. The method of claim 2 wherein the step of updating a plurality of candidate character sequences comprises determining a plurality of candidate character sequences, wherein
   (i) each candidate character sequence is updated to append a hypothesized character,
   (ii) a score for each candidate character sequence is updated based on a previous candidate character sequence score, where the previous candidate character sequence score is from a point previous in time corresponding to a number of strokes equal to a character length of the hypothesized character, and
   iii) the score for each candidate character sequence is combined with a corresponding one of the character scores.

4. The method of claim 3, wherein the step of determining a plurality of candidate character sequences comprises adding the corresponding one of the character scores to the maximum one of the previous candidate character sequence scores.

5. The method of claim 1, wherein the step of providing a database of characters comprises the steps of:
   a) acquiring (72) spatiotemporal training input from a user corresponding to an exemplar character, wherein the spatiotemporal training input is provided in the form of discrete input strokes;
   b) normalizing (74) the discrete input strokes into a sequence of normalized representations; and
   c) storing (76) the normalized representations into the database.

6. The method of claim 5, wherein the normalized representations are non-uniform rational b-splines scaled to fit between 0 and 1 in all parameters and coordinates.

7. The method of claim 1, wherein the step of comparing the discrete input strokes to the database comprises obtaining a plurality of distance measures between the discrete input strokes and each character's sequence of reference strokes in the database.

8. The method of claim 7, wherein the distance measure is selected from the group of distance measures consisting of Frechet, Hausdorff, Euclidian, averaged Euclidian, and elastic matching.

9. The method of claim 7, wherein the distance measure is weighted using a predetermined function.

10. The method of claim 1 wherein the step of acquiring spatiotemporal input from the user comprises separating the spatiotemporal input into the discrete input strokes.

11. The method of claim 1, wherein each discrete input stroke begins with a stylus down event and ends with a next stylus up-event.

12. The method of claim 1, wherein the step of acquiring spatiotemporal input from a user comprises determining a two-dimensional position of a stylus tip as a function of time.

13. The method of claim 12, wherein the two-dimensional position is represented as a series of discrete samples of stylus coordinates as a function of time.

14. The method of claim 1, further comprising the step of outputting a recognized character from the handwriting input.

15. The method of claim 14, wherein the recognized character is output after a predetermined number of input strokes.

16. The method of claim 15, wherein the predetermined number of input strokes equals the maximum character length.

17. The method of claim 14, wherein the recognized character is output after all candidate character sequences agree on the recognized character for a given point in time.

18. The method of claim 14, wherein the recognized character is represented in an encoding system chosen from the group of encoding systems consisting of ASCII and UNICODE.

19. The method of claim 1, further comprising the steps of:
deciding (96) recognized characters according to a predetermined convergence criterion;
determining (97) spatial relationships between the recognized characters; and
providing (98) recognized character output that includes special codes accounting for the spatial relationship information.

20. The method of claim 19, wherein the step of determining spatial relationships between the recognized characters comprises accounting for predefined spatial relationships defined for the recognized character.

21. The method of claim 19, wherein the recognized character output is provided in an expression encoding format selected from the group of formats consisting of MathType, Tex, and LaTex.

22. The method of claim 1, wherein the characters to be recognized are chosen from the group of characters consisting of English characters, Latin characters and variants thereof, Greek characters, Chinese characters, Braille characters, mathematical symbols, and combinations thereof.

23. The method of claim 1, wherein
the step of providing a database of characters comprises providing a trellis definition (50) having a plurality of nodes corresponding to a plurality of written characters to be recognized, each character defined by at least one discrete stroke element; and
the step of comparing the discrete input strokes to the database comprises defining and updating a plurality of node scores (60) for each discrete input stroke, wherein the node scores are advanced non-uniformly in time through the trellis.

24. The method of claim 23 wherein the step of updating a plurality of node scores comprises updating each node score based on a node score obtained previously in time from a number of strokes corresponding to a node hypothesis character.

25. A method of machine recognition of discrete multi-component symbolic input from a user, comprising:
a) providing a database of model input sequences, each model input sequence corresponding to a symbol to be recognized;
b) acquiring an input function from a user, the input function including a time function;
c) segmenting the input function into a sequence of input components; and
d) determining a plurality of hypothesis symbol sequences, wherein at least one of the hypothesis symbol sequences is updated for each acquired input component based on a comparison of the input component to the database and based on a hypothesis symbol sequence history from at least two components previously in time.

26. The method of claim 25, wherein the discrete multi-component symbolic input corresponds to written characters.

27. The method of claim 25, wherein the discrete multi-component symbolic input corresponds to phonemes.

28. A handwriting recognition system (10) comprising:
a) a capture subsystem (12) configured to accept spatiotemporal input from a user and output a digitized representation of the spatiotemporal input;
b) a processing subsystem (14) coupled to the capture subsystem to accept the digitized representation and determine recognized characters, the processing subsystem configured to:
i) separate the spatiotemporal input into discrete input strokes;
ii) compare the discrete input strokes to a database of model character stroke sequences to obtain a plurality of character scores; and
iii) determine a plurality of candidate character sequences, wherein
A) each candidate character sequence is updated to append a hypothesized character,
B) a score for each candidate character sequence is updated based on a previous candidate character sequence score, where the previous candidate character sequence score is from a point previous in time corresponding to a number of strokes equal to the character length of the hypothesized character, and
C) the score for each candidate character sequence is combined with a corresponding one of the character scores.

29. The system of claim 28 wherein the handwriting recognition system is embedded within a portable electronic device (20).

30. The system of claim 29 wherein the portable electronic device is selected from the group of devices consisting of a cellular telephone, a personal data assistant, and a laptop computer.

31. The system of claim 28 wherein the capture subsystem comprises a touch pad (22).

32. A non-transitory computer readable medium having computer readable program code embodied thereon for recognizing handwritten characters in a computer system having a user interface, comprising:
a) computer program code for providing a database of characters to be recognized, wherein for each character a character length sequence of reference strokes is defined;
b) computer program code for acquiring spatiotemporal input from the user interface and outputting discrete input strokes;

c) computer program code for comparing the discrete input strokes to the database to obtain a plurality of character scores;
d) computer program code for determining a plurality of candidate character sequences, wherein the candidate character sequences are updated as the input strokes are acquired and at least one candidate character sequences is updated based on a candidate character sequence history from at least two strokes previously acquired in time; and
e) computer program code for outputting a recognized character.

* * * * *